Nov. 3, 1942.                    G. W. ELEY                    2,300,879
                         MOUNTING MEANS FOR MOTORS
                            Filed Dec. 1, 1941                2 Sheets-Sheet 1
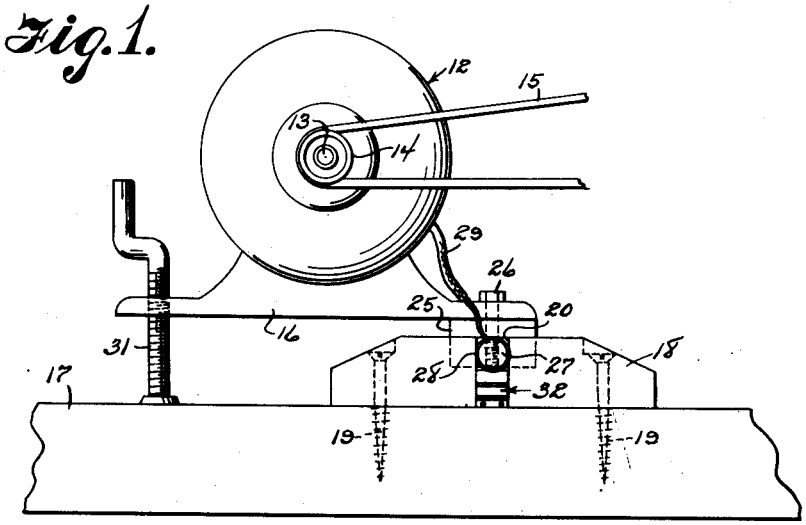
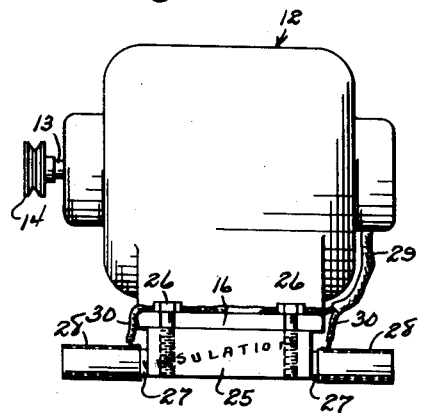
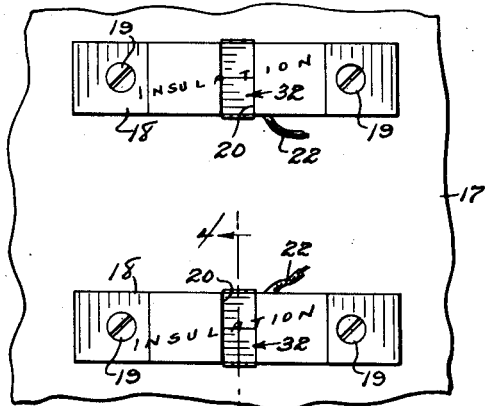
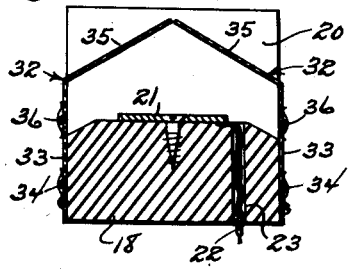
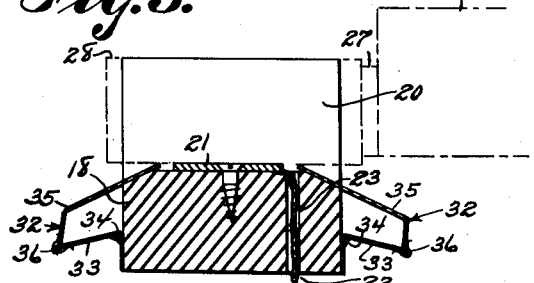
Gail W. Eley INVENTOR
BY Victor J. Evans & Co.
ATTORNEYS Nov. 3, 1942.   G. W. ELEY   2,300,879
MOUNTING MEANS FOR MOTORS
Filed Dec. 1, 1941   2 Sheets-Sheet 2
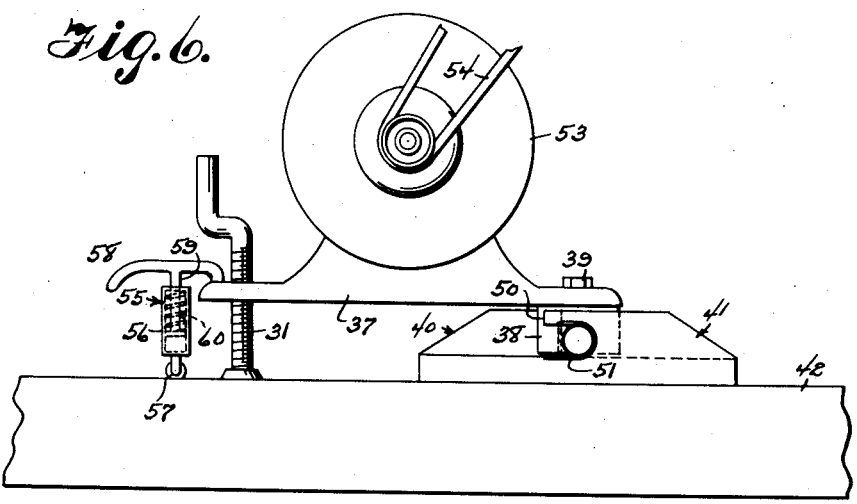
Fig. 6.
Fig. 7.
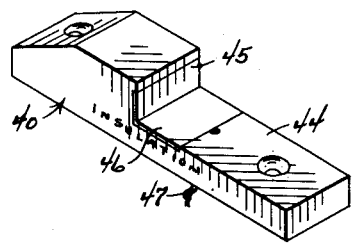
Fig. 8.
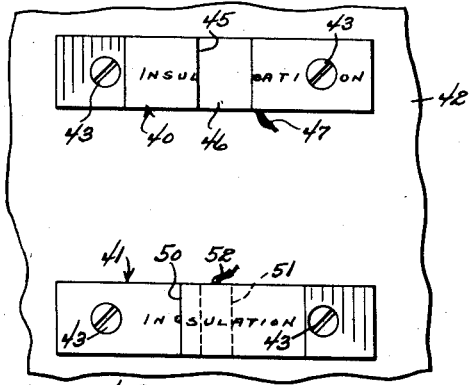
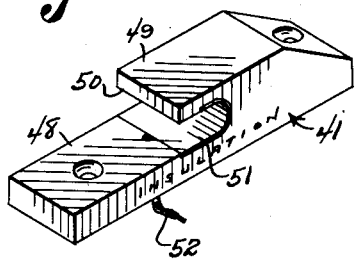
Fig. 9
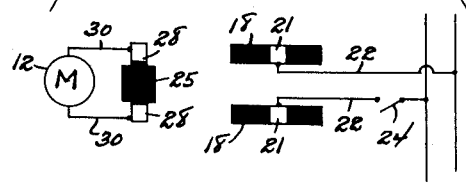
Fig. 10.
Gail W. Eley
INVENTOR
BY Victor J. Evans & Co.
ATTORNEYS Patented Nov. 3, 1942

2,300,879

UNITED STATES PATENT OFFICE 2,300,879

MOUNTING MEANS FOR MOTORS

Gail W. Eley, Milltown, N. J.

Application December 1, 1941, Serial No. 421,228

4 Claims. (Cl. 171—252)

The present invention relates to mounting means for motors and has for its primary object the provision of means whereby a single motor may be employed for operating a number of low-powered electrically driven shop tools such as lathes, band-saws, grinders, jointers, and the like.

In accordance with the present invention, a work-bench or table is equipped with a multiplicity of supporting members, preferably mounted in pairs connected with a source of electrical supply, each pair of members having a switch element for controlling the supply of electricity thereto. The motor for driving the shop tools is electrically connected with a contact bar and in the use thereof, the motor and its contact bar are removably supported on the members adjacent a tool desired to be driven, contact for driving the motor being effected through the plates and the contact bar.

Therefore, a further object of the invention is to provide improved means whereby an electric motor may be quickly, easily and removably mounted adjacent a machine or tool desired to be driven and connected directly to said machine or tool.

Another object of the invention is to provide a depressible cover for each of the supporting members which will substantially preclude the possibility of a short circuit being formed by the accidental placement of a conductor across the members.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Figure 1 is a side elevational view of a workbench with a motor supported thereon in accordance with the present invention.

Figure 2 is a front elevational view of the motor provided with a contact bar in accordance with the present invention.

Figure 3 is a top plan view of a pair of the supporting members mounted on a workbench, the motor being removed therefrom.

Figure 4 is a sectional view taken substantially on line 4—4 of Figure 3 and illustrating the feature of the means for covering the contact plates when the motor is detached therefrom.

Figure 5 is a sectional view similar to Figure 4 and illustrating the position of the safety cover with a motor mounted on the plates.

Figure 6 is a side elevational view of a modified form of the invention.

Figure 7 is a top plan view of the modified form of supporting members.

Figure 8 is a perspective view of one of the supporting members of the modified form.

Figure 9 is a perspective view of the other supporting member of the modified form.

Figure 10 is a diagrammatic wiring diagram.

Referring to the drawings for a more detailed description thereof and particularly Figures 1 to 5, inclusive, a motor of the type conventionally employed for operating electrically driven shop tools is generally designated by the reference numeral 12 having a driven shaft 13 on which is mounted a pulley 14 for rotation therewith, a belt 15 being trained over the pulley and extending to the machine or tool to be operated. Motors of this type are usually formed with a base 16 adapted to be fastened to the upper face of a workbench or table 17. In accordance with the present invention, the motor and its base are removably attached to the workbench 17 in such a manner that a number of electrically driven shop tools associated with the workbench may be operated thereby.

Pairs of supports 18 are secured by means of screws or the like 19 to the face of the workbench 17, said supports being formed of a material that is a non-conductor of electricity. The supports 18 will be suitably spaced over the area of the workbench 17 in close association with the various tools or machines to be driven by the motor 12 and which are also supported on the workbench, but not shown. In the preferred form of the invention, each support is formed with a transverse slot 20 in which is mounted a contact plate 21. Each plate 21 has a wire 22 extending therefrom through a vertical channel 23 formed in the supports 18, the wire 22 leading from a source of electrical supply. As shown in Figure 10 of the drawings, one of the wires 22 is connected with a switch 24 conveniently located on the workbench 17 and upon closing the switch current will flow through the plates for driving the motor 12 as will hereinafter appear.

The invention further includes the use of a bar 25 that is secured by means of bolts 26 to one edge of the motor base 16. The bar 25 is also formed of a material that is a non-conductor of electricity, or it may be insulated from the motor. The bar 25 is substantially rectangularshaped in cross section but each end thereof is shaped in the form of a cylindrical projection 27 on which are positioned cylindrical-shaped contact members 28. As more particularly shown in Figure 2 of the drawings, the conducting cord 29 leading to the motor 12 comprises a pair of wires 30, one wire being soldered or otherwise suitably connected to each contact member 28.

The motor 12 is positioned on the workbench in such a manner that the contact bar 25 will extend transversely of the supports 18 with the contact members 28 resting in the slots 20 and in contact with the plates 21. When so positioned closing of the switch 24 will make an electrical contact between the plates 21 and the contact members 28 to operate the motor 12.

A threaded crank arm 31 associated with the rear edge of the bar 16 is provided to reduce vibration of the motor and also to regulate the proper tension of the drive belt 15. Turning the crank to the right or to the left will quickly regulate the belt to the proper tension.

In order to eliminate the possibility of a short circuit being formed by dropping a conductor across the contact plates 21 when said plates are not in use, there is provided a cover best shown in Figure 4 of the drawings and generally designated by the reference numeral 32. The cover 32 is formed of an insulating material and comprises upright side members 33 attached to the side walls of the support 18 and supported on spring hinges 34, and angular members 35 hinged to the upright members 33 as indicated at 36, said members 35 having their upright ends meeting at an angle. The position of the cover 32, when the motor is mounted on the supports 18, is shown in Figure 5 of the drawings, the weight of the ends 27 of the contact bar 25 spreading the cover on its hinges to the position shown. As soon as the motor is removed, however, the tension on the spring hinges will return the cover to the position shown in Figure 4.

In the form of the invention above described, the pairs of supports are mounted at various points about the workbench 17 and the motor base 16 and its contact bar 25 are readily positioned on the supports and removed therefrom. Thus a single motor may be employed for operating a number of low-powered electrically driven shop tools such as lathes, band-saws, grinders, and the like.

In Figures 6, 7, 8 and 9 of the drawings, there is disclosed a modified form of the invention, the modification primarily residing in the construction of the supports for the motor. As in the preferred form, the motor base 37 has a contact bar 38 attached to one edge thereof by means of bolts or the like 39. The base and its contacting bar are adapted to be mounted transversely of the pair of supports 40 and 41, said supports being secured to the face of a supporting standard 42 by means of screws or similar fastening means 43. By referring to Figures 8 and 9 of the drawings, it will be observed that the supports 40 and 41 are of different construction. The support 40 has one end cut away as indicated at 44 and in the angular portion 45 there is attached a metal contact plate 46, said contact plate being connected to a wire 47 leading to a source of electrical supply, as in the preferred form. The support 41 is also cut out as indicated at 48, but its top wall 49 protrudes outwardly forming a lip 50. A metal contact strip 51 is attached to the support, the same extending beneath the lip 50 as is clearly shown in Figure 9. The contact strip 51 also has a wire 52 leading to a source of supply as in the preferred form.

The purpose of this type of motor support is to permit the motor 53 to be mounted beneath the workbench in which case the supporting member 42 will be disposed beneath the workbench, on which the supports 40 and 41 are mounted. The drive belt 54 will, of course, extend through appropriate openings formed in the workbench adjacent the machine or tool to be operated. When positioning the motor 53, one end of the contact bar 38 will rest upon the contact strip 46, while the other end will be disposed on the contact strip 51 beneath the lip 50. The end of the contact bar being held beneath the lip 50 will aid in maintaining the motor properly positioned during its operation. However, in order to use the motor in this position, it is necessary to employ a simple hold-down spring of the type generally designated by the numeral 55 in Figure 6 of the drawings. The hold-down spring includes a casing 56 suitably secured as indicated at 57 to the support 42, an actuating arm 58 having a portion 59 extending within the casing around which is mounted a spring 60. The tension of the spring 60 maintains the arm 58 in engagement with the edge of the motor base 37. In order to disengage the arm from the base, it is necessary to exert an upward pull thereon. This type of fastener is similar to the type conventionally employed for maintaining automobile motor hoods in position.

The supporting means in accordance with the modified form of the invention also permits the motor to be rapidly positioned and removed about the workbench for operating various types of electrically driven tools.

What is claimed is:

1. In combination with a motor having a supporting base, a bar attached to the base and having its ends electrically connected with the motor, of a mount for the motor, said mount comprising a pair of spaced members secured to a supporting structure, contact plates attached to each member and electrically connected with a source of supply, said motor base adapted to be positioned transversely of the spaced members, and means for guiding the ends of the bar into engagement with said contact plates, whereby completing a circuit to said plates will drive the motor through said bar ends.

2. In combination with a motor having a supporting base, a bar attached to the base and having its ends electrically connected with the motor, of a mount for the motor, said mount comprising a pair of spaced members secured to a supporting structure, each of said members having a transverse slot formed therein, a plate secured in each of said slots and electrically connected with a source of supply, said motor base adapted to be positioned transversely of the spaced members with the ends of the bar disposed in said slots and in engagement with said plates, whereby completing a circuit to said plates will drive the motor through said bar ends.

3. In combination with a motor having a supporting base, a bar attached to one edge of the base, said bar being formed of insulating material and its ends provided with contact members electrically connected with the motor, of a mount for the motor, said mount comprising a pair of spaced members secured to a supporting structure, contact plates attached to each member and electrically connected with a source of supply, said motor base adapted to be positioned transversely of the spaced members and said contact members of the bar in engagement with said contact plates, whereby completing a circuit to said plates will drive the motor through said bar ends.

4. A mount for a motor comprising a pair of spaced members secured to a supporting structure, each of said members having a transverse slot formed therein, a contact plate mounted in each of said slots and electrically connected with a source of supply, a contact bar adapted to be secured to the base of the motor to be removably positioned in said slots in engagement with said contact plates, and a housing formed of non-conducting material attached to each of said members for normally concealing said contact plates, said housing adapted to fold outwardly upon contact of the motor base therewith for uncovering the contact plates.

GAIL W. ELEY.